United States Patent
Kram et al.

(10) Patent No.: US 8,244,140 B2
(45) Date of Patent: Aug. 14, 2012

(54) COMMUNICATING WITH COMPONENTS IN OPTICAL COMMUNICATION SYSTEMS USING VOLTAGE SIGNAL DETECTION AND SIGNATURE ANALYSIS

(75) Inventors: Richard Kram, Ocean, NJ (US); Jonathan M. Liss, Marlboro, NJ (US); Michael W. Hall, Middletown, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 508 days.

(21) Appl. No.: 12/481,996

(22) Filed: Jun. 10, 2009

(65) Prior Publication Data

US 2010/0316375 A1      Dec. 16, 2010

(51) Int. Cl.
*H04B 10/08*      (2006.01)
*H04L 29/08*      (2006.01)

(52) U.S. Cl. .............. 398/171; 398/30; 398/33; 398/38; 398/167.5

(58) Field of Classification Search .............. 398/83, 398/104, 186

See application file for complete search history.

(56) References Cited

U.S. PATENT DOCUMENTS

| 6,134,032 | A | 10/2000 | Kram et al. |
| 6,260,062 | B1 * | 7/2001 | Davis et al. ................. 709/223 |
| 6,839,597 | B2 * | 1/2005 | Hattori et al. ................. 700/27 |
| 6,980,711 | B2 | 12/2005 | Feinberg et al. |
| 7,382,947 | B1 | 6/2008 | Moskowitz et al. |
| 7,415,211 | B2 | 8/2008 | Feinberg et al. |
| 2006/0034617 | A1 * | 2/2006 | Reintjes et al. .............. 398/186 |
| 2009/0028566 | A1 * | 1/2009 | Abbott .......................... 398/83 |

OTHER PUBLICATIONS

International Search Report and Written Opinion dated Aug. 5, 2010 issued in related International Patent Application No. PCT/US2010/037536.

* cited by examiner

*Primary Examiner* — Danny Leung
(74) *Attorney, Agent, or Firm* — Grossman, Tucker, Perreault & Pfleger, PLLC (57) ABSTRACT

Communication from a component in an optical communication system may be effected by modulating a system power voltage across the component to generate voltage signals representing the information to be communicated. The voltage signals generated by the component are detectable in the power feed equipment (PFE) in the optical communication system. Signature analysis may be performed on the system voltage data to identify the voltage signals and determine the information being communicated.

20 Claims, 9 Drawing Sheets

COMMUNICATING WITH COMPONENTS IN OPTICAL COMMUNICATION SYSTEMS USING VOLTAGE SIGNAL DETECTION AND SIGNATURE ANALYSIS

TECHNICAL FIELD

The present invention relates to optical communication systems, and more particularly, to communicating with components in optical communication systems using voltage signal detection and signature analysis.

BACKGROUND INFORMATION

Optical communications systems generally include stations or terminals connected by an optical transmission path. In an undersea optical communication system, for example, shore stations may be separated by distances of 10,000 km or more. The optical transmission path may include an optical fiber cable coupled from one station to another through various elements or components, such as repeaters, branching units, etc. The optical fiber cable may include multiple optical fiber pairs for bi-directional transmission of information, e.g., on a plurality of separate wavelength channels in a wavelength division multiplexed (WDM) system, and a power conductor for providing electrical energy required for operation of the elements connected thereto.

The components in an optical communication system are often located remotely from the stations and in an undersea optical communication system may be located on the ocean floor. These components often are controlled remotely by sending commands from the stations to the remote components. A branching unit, for example, may be controlled remotely to provide optical and/or electrical switching. The station may not know, however, if a command is received and a function is performed in the remote element unless a confirmation is sent back to the station. Although the commands may be sent as optical commands to the remote components over the optical transmission path, providing the confirmation back to the station over the optical transmission path is more challenging. An optical transmitter or regenerator may be provided in the remote components for generating and transmitting an optical command; however, this may add significantly to the cost and may reduce the reliability of the components. In addition to confirming the receipt of a command and/or performance of a function, it may also be desirable to communicate other information (e.g., internal hardware status) from remote components in an optical communication system.

BRIEF DESCRIPTION OF THE DRAWINGS

These and other features and advantages will be better understood by reading the following detailed description, taken together with the drawings wherein.

DETAILED DESCRIPTION

In general, communication from a component in an optical communication system may be effected by modulating a system power voltage across the component to generate voltage signals representing the information to be communicated. The voltage signals generated by the component are detectable in the power feed equipment (PFE) in the optical communication system. Signature analysis may be performed on the system voltage data to identify the voltage signals and determine the information being communicated.

Figure 1:
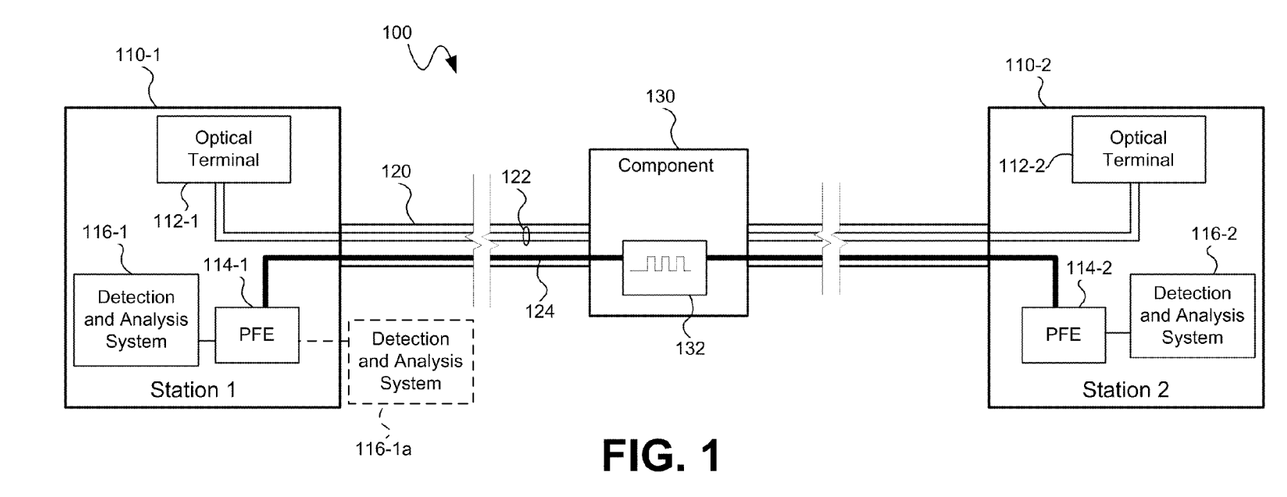
FIG. 1 is a simplified functional block diagram of an optical communication system that communicates with components in the system using voltage signal detection and signature analysis, consistent with an embodiment of the present disclosure.

Referring to FIG. 1, an optical communication system 100, consistent with an embodiment, includes cable stations 110-1, 110-2 connected via an optical transmission cable 120, such as a fiber optic cable, and one or more components 130, such as repeaters, branching units, or the like. Those skilled in the art will recognize that the system 100 has been depicted as a highly simplified point-to-point system for ease of explanation. It is to be understood the present disclosure may be incorporated into a wide variety of optical networks and systems. The system 100 may include, for example, any number of cable stations, cable segments, repeaters, branching units, and other components.

System 100 may be configured as a long-haul system, e.g. having a length between cable stations 110-1, 110-2 of more than 600 km, and may span a body of water. When used to span a body of water, e.g. an ocean, components 130, such as repeaters and branching units, may be seated on the ocean floor and the transmission cable 120 may span between beach landings to extend from the water for coupling to the cable stations 110-1, 110-2.

The cable stations 110-1, 110-2 generally include optical terminals 112-1, 112-2 for handling optical communication over the optical transmission cable 120. The optical communication system 100 may be configured as a wavelength division multiplexed (WDM) system in which the optical terminals 112-1, 112-2 include optical transceivers that generate a plurality of separate optical signals by modulating data on each of a plurality of different wavelengths/channels within a signal bandwidth. The channels may be multiplexed into an aggregate optical signal and transmitted by one transceiver over the optical transmission cable 120 to another transceiver. At the receiving transceiver, the aggregate signal may be demultiplexed into the separate optical signals for demodulation of the data modulated thereon. The optical transmission cable 120 may include one or more optical fiber pairs 122 that carry the optical signals bi-directionally between the optical terminals 112-1, 112-2.

The cable stations 110-1, 110-2 also include power feed equipment (PFE) 114-1, 114-2 configured to supply and regulate the electrical energy for operation of the components 130.

The optical transmission cable 120 includes one or more power conductors 124 that supply power to the component(s) 130 coupled to the cable 120. The component(s) 130 may include a voltage signal generator 132 that modulates the voltage supplied across the component 130 to generate the voltage signal(s) on the power conductors 124. The voltage signal may be detected from voltage data acquired from the PFE 114-1, 114-2 in the cable stations 110-1, 110-2. In one embodiment, one or more of the cable stations 110-1, 110-2 may include a voltage signal detection and analysis system 116-1, 116-2 for acquiring the voltage data from the PFE 114-1, 114-2 and for analyzing the voltage data to detect the voltage signal, as will be described in greater detail below. The voltage signal detection and analysis system 116-1a may also be located external to the cable stations 110-1, 110-2.

To provide communication from the component 130, the voltage signal(s) generated in the component 130 may represent information associated with the component. In an embodiment, the voltage signal may represent a response, such as an affirmative or negative response, to a command or query received in the component 130. In a branching unit, for example, the voltage signal may be an affirmative or negative response confirming the successful or unsuccessful execution of a switching command, as described in greater detail below. The voltage signal may also represent the state or status (e.g., the internal hardware status) of the component 130 and may be sent at some other time (e.g., periodically or at predetermined times) without responding to a particular command or query. The component 130 may, for example, send voltage signals broadcasting its state. The voltage signal may also represent other information associated with the component 130, such as a location, identifier, or the like.

Figure 2:
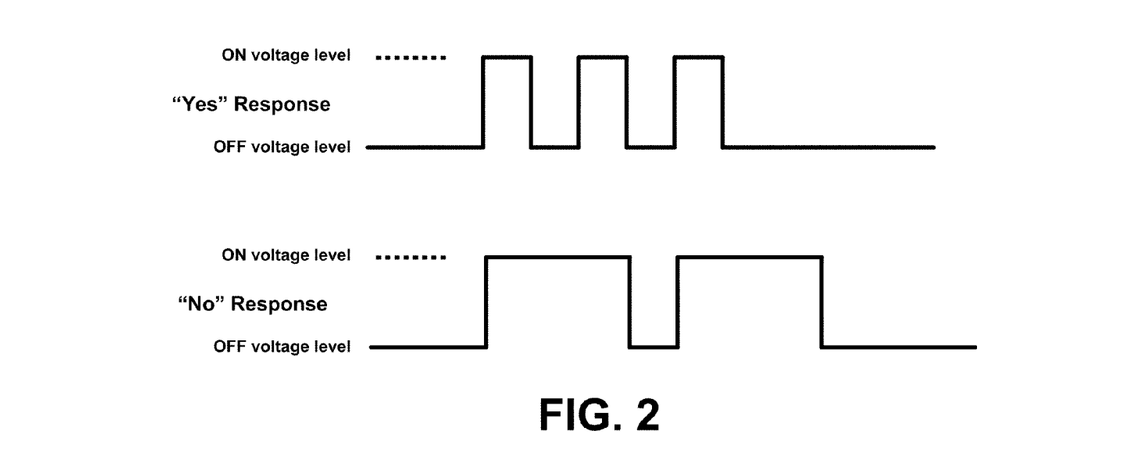
FIG. 2 is a graphical representation of exemplary voltage signals generated by components in an optical communication system, consistent with an embodiment of the present disclosure.

Referring to FIGS. 2A and 2B, one embodiment of the voltage signal generator 132 may generate a voltage signal including one or more pulses. For example, the voltage signal generator 132 may turn on and off an increase in the internal voltage drop across the component 130, thereby causing a modulation of the cable system voltage that is detectable at the PFE 114-1, 114-2 of the stations 110-1, 110-2. As shown, different responses may be represented using different signal patterns that are selected to provide for reliable discernment (e.g., three narrower pulses represent an affirmative "Yes" response and two wider pulses represent a negative "No" response). Pulses of any number, frequency, and width may be used to represent different responses, states, and/or other types of information associated with the component.

Another example of a voltage modulation in a component is described in greater detail in U.S. Patent Application Publication No. 2009/0028566, which is fully incorporated herein by reference. Various types of modulations and signal shapes or patterns may be used.

One of the voltage signal detection and analysis systems 116-1, 116-2 may then sample the PFE voltage and analyze the PFE voltage data to determine the information represented by the signal (e.g., the response to the command). Because the power paths are often dual fed, the voltage analysis may be performed on more than one set of PFE data if desired.

Figure 3:
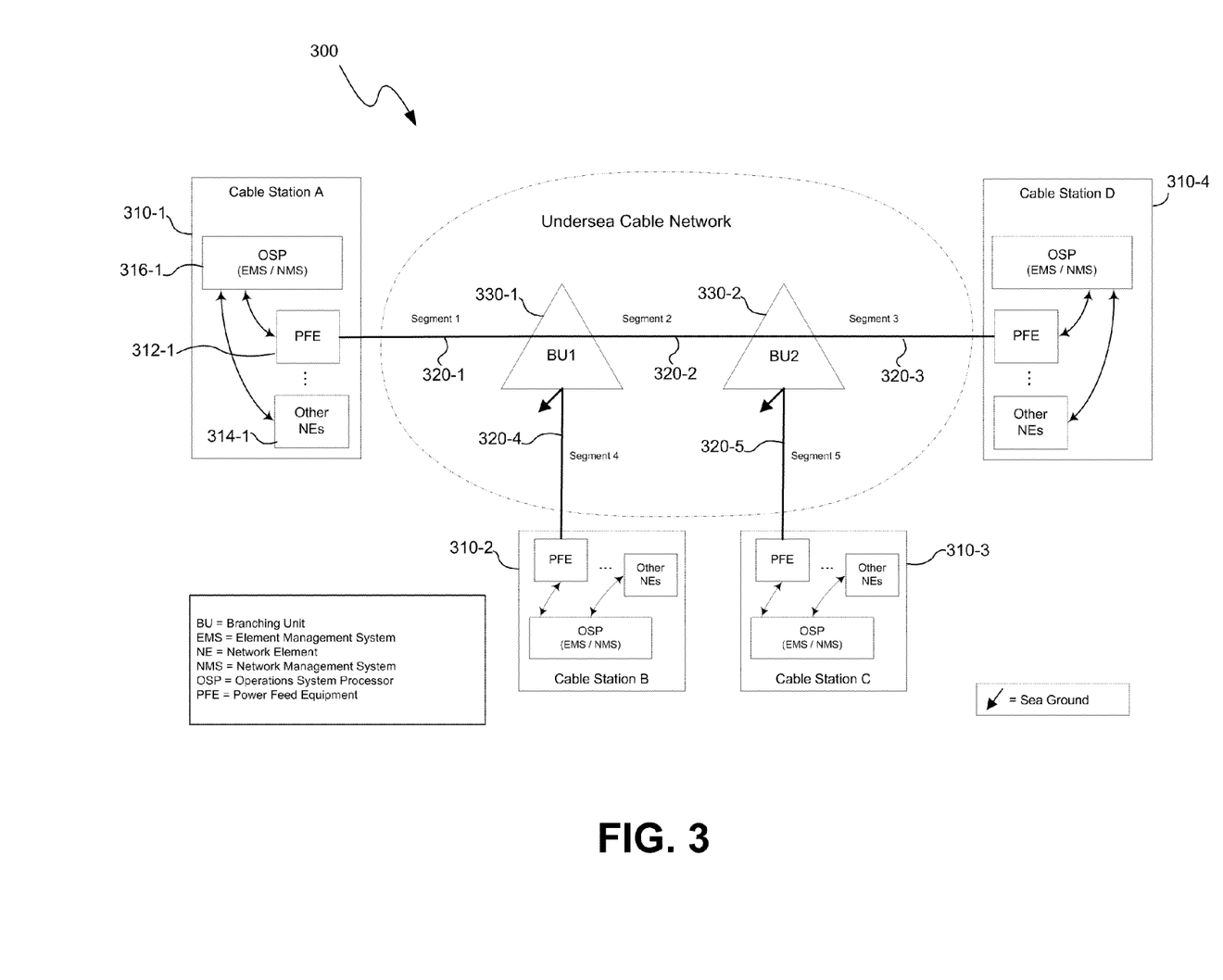
FIG. 3 is a simplified functional block diagram of an undersea branched optical communication system that communicates with components in the system using voltage signal detection and signature analysis, consistent with an embodiment of the present disclosure.

Referring to FIG. 3, a branched optical communication system 300, consistent with an embodiment, may use system voltage modulation to receive communications from branching units, for example, to verify switching functions. The system 300 may include a network of cable stations 310-1 to 310-4 coupled by cable segments 320-1 to 320-5 and branching units 330-1, 330-2. Although a specific configuration is shown, a branched optical communication system may include any number of cable stations, cable segments and branching units. The branched optical communication system may also include other components such as repeaters located along the cable segments. In an undersea communication system, at least a portion of the cable segments 320-1 to 320-5 and branching units 330-1, 330-2 are located underwater and the cable stations 310-1 to 310-4 may be located on land.

As mentioned above, the cable stations 310-1 to 310-4 may include power feed equipment (PFE) (e.g., PFE 312-1) and other network elements (E.g., NE 314-1) such as optical terminal equipment. The cable stations 310-1 to 310-4 may also include an operations system processor (e.g., OSP 316-1). The operations system processor may operate to provide a network management system (NMS) for managing the network of elements and/or an element management system (EMS) for managing elements within the network.

The branching units 330-1, 330-2 provide routing of fiber pairs between three or more of the cable stations 310-1 to 310-4. The branching units 330-1, 330-2 may include any known branching unit configuration that splits the cable, e.g. to a branch cable, to allow data transmission to more than one destination. Known branching units include configurations that split the cable by, for example, physically separating the signal-carrying fibers to direct one group of fibers in one direction, e.g. to a transceiver and another group in another direction, e.g. to a branch cable. Other known configurations may split the cable by converting the optical signals to electrical signals, using an add-drop multiplexer to divide and recombine the signals on the desired paths, then reconverting back to optical signals. Other configurations use an optical add-drop multiplexer (OADM) to direct optical carrier frequencies down desired paths. Combinations of techniques may also be implemented.

The branching units 330-1, 330-2 may be equipped with high voltage switches that enable electrical current from the PFE in the cable stations 310-1 to 310-4 to be routed through the network to power components (e.g., repeaters) in the cable segments 320-1 to 320-5. By transmitting optical switch commands to the branching units 330-1, 330-2, the routing of the PFE currents can be changed to establish various different network powering configurations, for example, to recover from a cable break.

The ability to efficiently and reliably control the branching units 330-1, 330-2 to reconfigure network power may be critical to system maintenance. When a service outage occurs due to a cable fault, for example, one or more of the branching units 330-1, 330-2 can often be switched to establish a new powering configuration that quickly restores customer traffic. Following restoration, the branching units 330-1, 330-2 may be switched to isolate the faulted cable segment from PFE high voltage power to enable the cable to be safely repaired. In general, such network power reconfiguration operations involve several switch commands sent sequentially to multiple BUs in the network.

As shown, for example, cable segments 320-1, 320-2, 320-3 may be powered by the PFEs in stations 310-1, 310-2; cable segment 320-4 may be powered by the PFE in station 310-2; and cable segment 320-5 may be powered by the PFE in stations 310-3. If a cable shunt fault were to occur in the segment 320-4, for example, power would be lost between branching unit 330-1 and the fault and a service outage would result. Service may be restored by first sending a command to the branching unit 330-1 to ground all legs, followed by a second command to route the power from the station 310-1 through the branching unit 330-1 to the fault. In more complex networks, network power operations may involve sending several commands to multiple branching units.

During network power operations, problems may be avoided if a switch attempt is confirmed to have been successfully completed before proceeding to send the next command. A failed switch attempt may be caused by terminal equipment problems, attempted command transmission through a section of faulted cable, or a branching unit malfunction. Failure to detect that a branching unit did not properly switch during network power operations could result in lengthy and large scale customer service outages when subsequent switch commands are made.

Thus, one type of information provided by branching units 330-1, 330-2 may be a confirmation of completion of a command, such as switch commands, by communicating an affirmative or negative response using voltage signals. Additionally or alternatively, the branching units 330-1, 330-2 may communicate a voltage signal representing the internal power configuration of the branching unit, the provisioning of the branching unit, the internal hardware status of the branching unit, or any other information pertaining to the functioning or state of the branching unit. Such communication may be used for troubleshooting or adjusting internal operating parameters.

To communicate the confirmation or other information, the branching units 330-1, 330-2 may include a voltage signal generator, such as voltage signal generator 132 in component 130 shown in FIG. 1 and described above. After one of the branching units 330-1, 330-2 receives a command, for example, the branching unit attempts to execute the command and then performs an internal hardware verification to confirm completion. If the branching unit confirms that the command was executed and completed successfully (e.g., the unit switched successfully to the new powering state), the branching unit generates the voltage signal representing an affirmative response, for example, by turning on and off its internal voltage drop in a specific pattern that signals a "yes" response. If the branching unit is not able to confirm that the command was executed and completed successfully, the branching unit generates the voltage signal representing a negative response, for example, by turning on and off its internal voltage drop in a specific pattern that signals a "no" response. A delay between the command completion and the response may be determined by a parameter that can be configured in the branching unit, for example, by a separate BU command.

Optical commands may also be sent to the branching unit at any time after the switch completes to query if the branching unit is in the intended switch state and/or to obtain more detailed branching unit status. The branching units 330-1, 330-2 may respond to any command or a query with an affirmative or negative response such as disclosed above. The branching units 330-1, 330-2 may also generate voltage signals representing any other information associated with the branching unit either in response to a command or query or at predetermined times (e.g., regular intervals, when powered on, etc.)

Although the use of the voltage signals provides a way of communicating from the branching units (or other components) without using an optical transmitter in the branching unit, the detection of the voltage signals presents challenges. The voltage signal modulation levels may be relative low (e.g., ~$\frac{1}{1,000}$ of the PFE high voltage power supply) and distortion due to cable capacitance can also severely smooth the voltage signals. In addition, PFE voltage noise, wander, background adjustments and earth potential variations can further obscure the voltage signal(s) as well as significant changes in the data set due to large voltage drops caused by normal PFE voltage switching and/or ramping. Accordingly, a PFE automatic signature analysis (PASA) technique may be used to enable reliable detection of the low level voltage signals in the presence of nose, cable distortion and large voltage changes. PASA signal detection, consistent with embodiments described herein, may eliminate the time consuming and error prone manual interpretation of voltage signals, which may provide substantial improvement to the efficiency and reliability of network power operations in an optical communications network.

Figure 4:
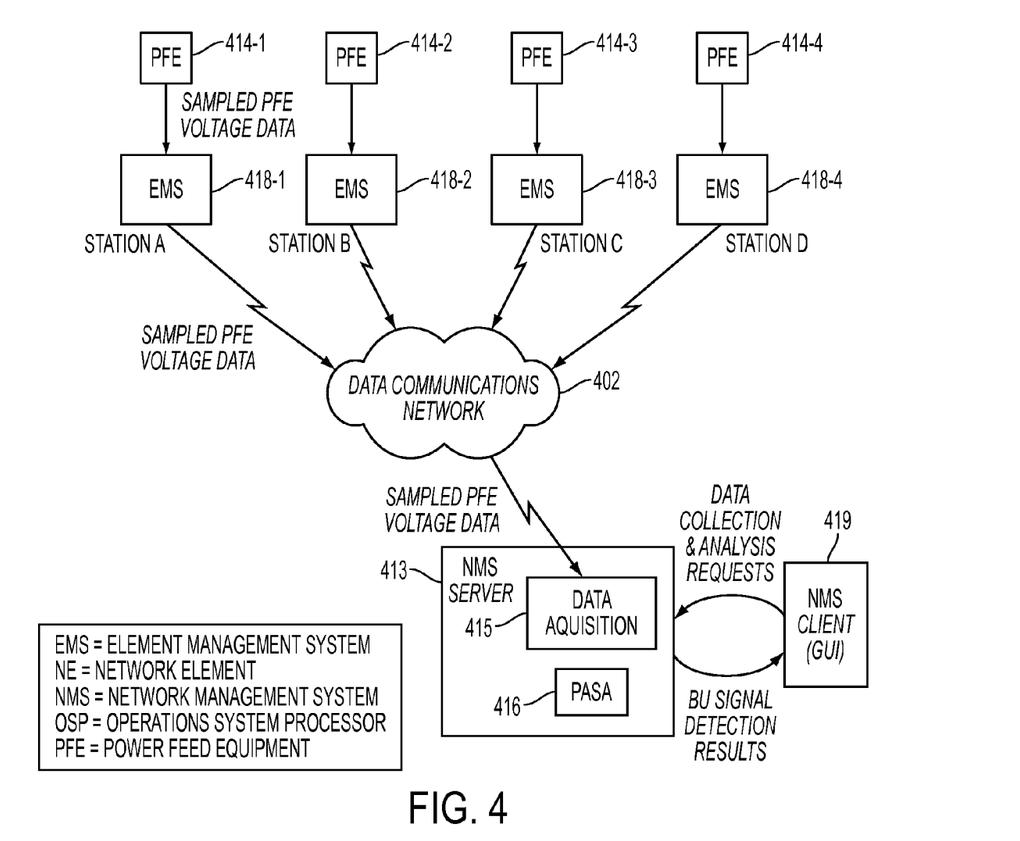
FIG. 4 is a simplified functional block diagram of a network management system (NMS) and element management system (EMS) architecture used for voltage signal detection and signature analysis.

As shown in FIG. 4, voltage signal detection and analysis in an optical communication system may be handled by or in conjunction with one or more network management systems (NMSs) and/or element management systems (EMSs) in the optical communication system. An NMS may include an NMS server 413 coupled to an NMS client 419 providing a graphical user interface to allow an operator to interact with the NMS, as generally known to those skilled in the art. The NMS server 413 communicates with EMSs 418-1 to 418-4 over a data communications network 402. To handle voltage signal detection and analysis, the NMS server 413 may include a data acquisition system 415 and a PFE automatic signature analysis (PASA) system 416. The data acquisition system 415 and the PASA system 416 may be implemented, for example, as software processes running on the NMS server 413. The software implementation of the data acquisition system 415 and the PASA system 416 may be integrated with the NMS software, as a function call of the NMS software, or as software that is entirely separate from the NMS software.

To detect the voltage signals (e.g., to obtain the response to a command or query to a component), a network operator at the NMS client 419 may initiate a PFE voltage data collection from one or more PFEs 414-1 to 414-4. One or more of the EMSs 418-1 to 418-4 may then sample the PFE voltages from the one or more PFEs 414-1 to 414-4 for a period of time to generate the voltage data. The sampled voltage data may then be forwarded to the NMS server 413 where it is logged by the data acquisition system 415 for analysis by the PASA system 416. The PASA system 416 may then perform signature analysis operations on the logged PFE voltage data and present the results to the network operator. Voltage signal detection and analysis may also be implemented using other architectures, for example, as software, hardware, firmware or any combination thereof.

Figure 5:
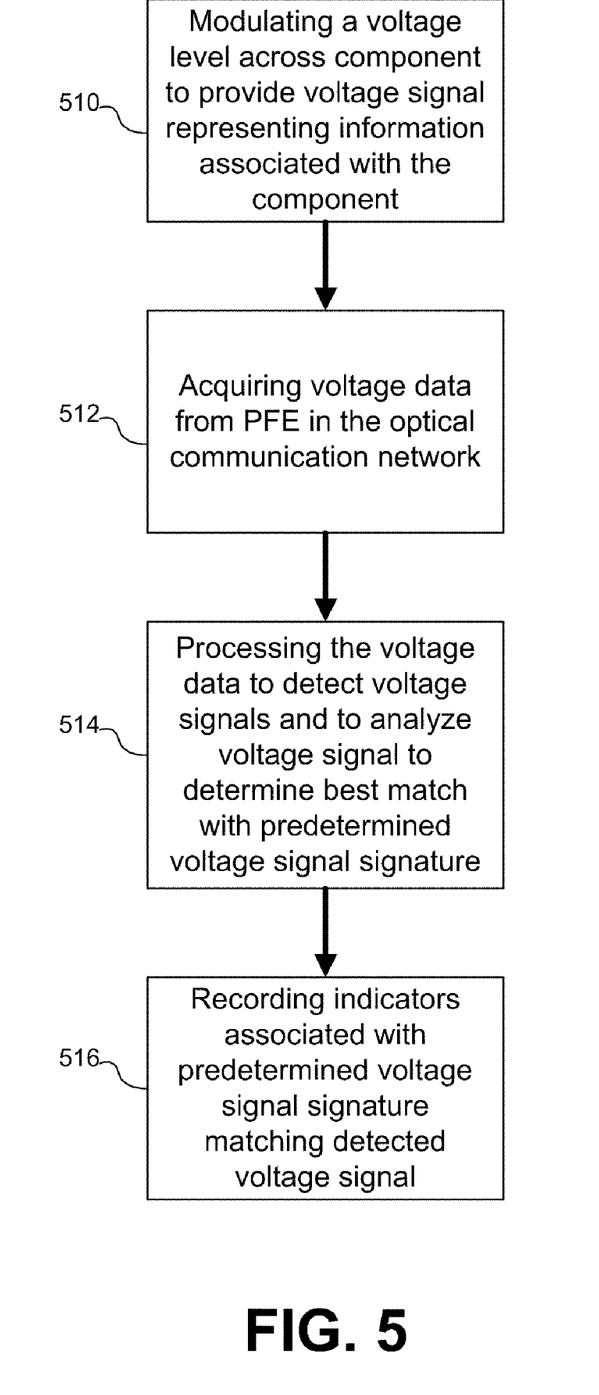
FIG. 5 is a flow chart illustrating a method of communicating with a component in an optical communication system using voltage signal detection and signature analysis, consistent with an embodiment.

FIG. 5 illustrates a general method of communicating with a component in an optical communication system, consistent with an embodiment. According to this method, a voltage level across the component is modulated 510 to provide at least one voltage signal representing information associated with the component. The voltage level may be modulated, for example, by switching the internal voltage drop on and off to generate pulses. As mentioned above, for example, the voltage signal may represent an affirmative or negative response to a command or query to the component or may directly represent a state or other information associated with the component (e.g., a current switching configuration of a branching unit).

The voltage data from the PFE in one or more of the cable stations is then acquired 512. As mentioned above, for example, the EMS in one or more of the cable stations may sample the voltage in the PFE and forward the voltage data to the NMS for acquiring the voltage data to be processed. In an embodiment, the voltage data may be acquired by logging the sampled voltage data in a data file. The voltage data may then be processed 514 to detect one or more voltage signals within the voltage data and to analyze the voltage signal(s) to determine a best match between the detected voltage signal(s) and one or more predetermined voltage signal signatures. As used herein, processing refers to the act of manipulating data using a computer or other machine that has been specifically configured or programmed to perform these operations. The predetermined voltage signal signatures are associated with predetermined indicators that provide the information associated with the components. As described above, for example, the predetermined indicators may be a "yes" or "no" response indicating whether or not a switching function has been successfully completed in a branching unit. The one or more indicators associated with the one or more matching predetermined voltage signal signatures may be recorded 516, thereby providing the information communicated from the component.

Figure 6:
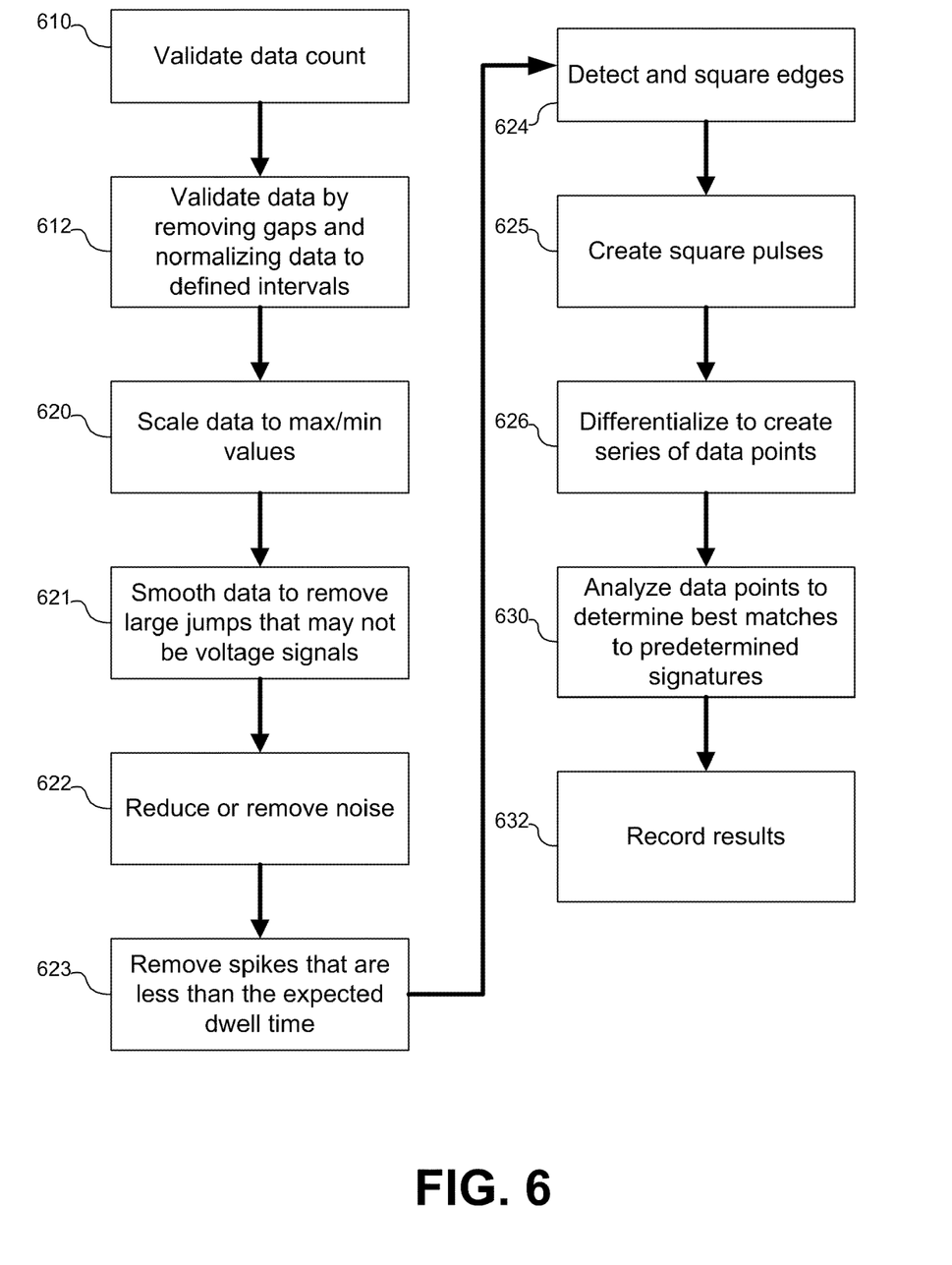
FIG. 6 is a flow chart illustrating a more detailed method of performing automatic signature analysis, consistent with an embodiment.

FIG. 6 illustrates in greater detail a PFE automatic signature analysis (PASA) method used to detect and identify voltage signals including an expected pattern of one or more pulses. This method is described in connection with FIGS. 7A-7G, which illustrate the processing of the voltage data using plots of voltage data generated from a simulation. The PASA method may be a self-adjusting, multi-pass algorithm implemented using software, hardware, firmware or any combination thereof. The exemplary method includes data validation operations 610, 612, preprocessing operations 620-626, and analysis operations 630, 632. In general terms, the data validation operations 610, 612 may be performed to determine that the voltage data set is in a standardized form that is capable of being processed and analyzed. The data preprocessing operations 620-626 may be performed to adjust the data values such that the pulses forming the voltage signals can be more easily detected and analyzed. The analysis operations 630, 632 generally determine what information is represented by the pattern of pulses forming the voltage signals.

Figure 7A:
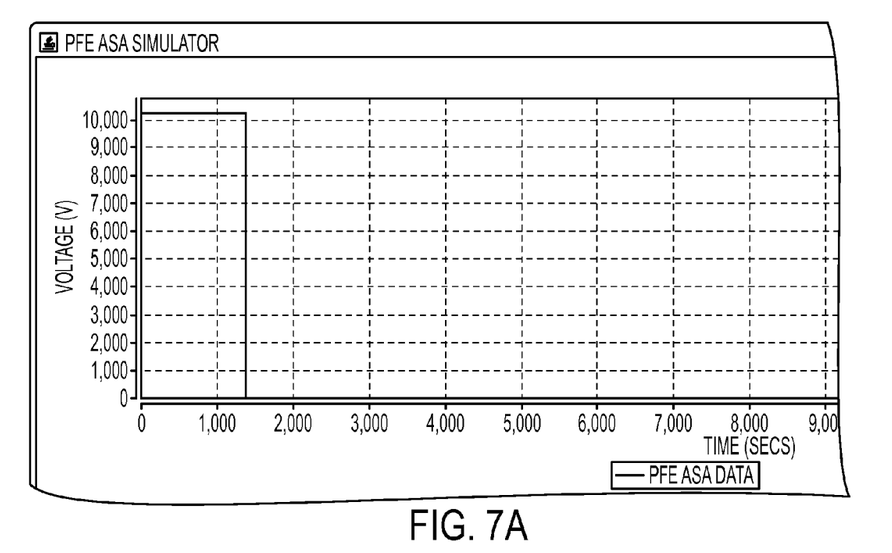
FIGS. 7A-7H are voltage data plots illustrating the voltage data after different signature analysis processing operations.

FIG. 7A shows one example of PFE voltage data that has been obtained by sampling the PFE voltage. After the acquired PFE voltage data has been logged (e.g., into a data file for processing), the voltage data count may be validated 610 to make sure enough data is present for an analysis. The voltage data may also be validated 612 by removing any gaps in the data and normalizing the data to defined intervals (e.g., 1 second), thereby producing a complete and contiguous set of data with data points at the defined interval. For example, any gaps in the data may be "filled in" by repeating the last known valid data point. If data was collected at any interval other than the defined interval, the data may be adjusted to the defined interval by repeating the last known valid data point. In one embodiment, therefore, the validation allows processing of voltage data even if the data has time gaps from being collected over varying time periods and with varying sample collection rates.

Figure 7B:
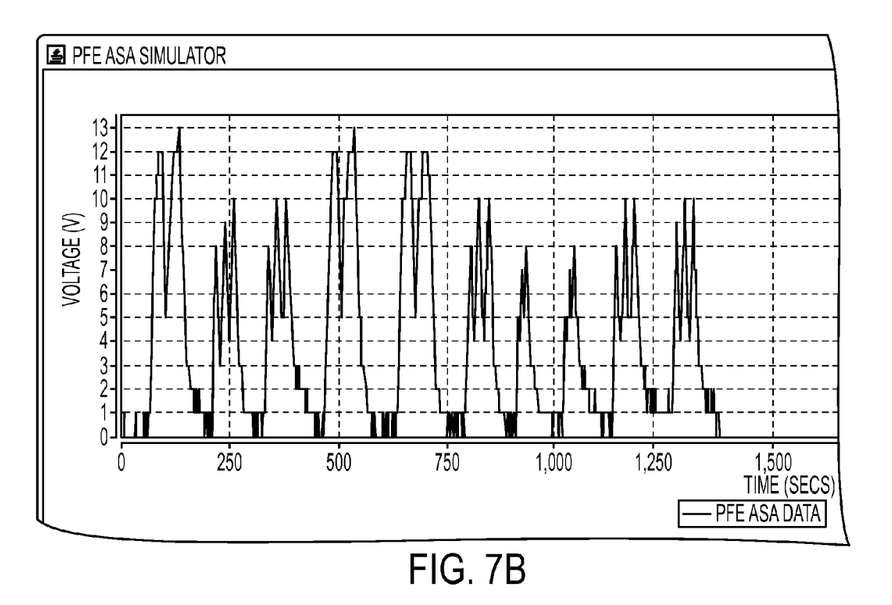

During preprocessing, the validated voltage data may then be scaled 620 to maximum and minimum values with 0 as the new minimum. In other words, the scaling of the voltage data "zooms in" on the data that may form the pulses of the voltage signals. FIG. 7B shows one example of the voltage data after validation and scaling. The validated and scaled voltage data may then be smoothed 621 to remove any large jumps in the data set that may not be voltage signals, thereby creating a voltage data set that is within a relatively narrow range. For example, any voltage data representing a larger voltage change above a configurable threshold (which may be set to 12 V in one embodiment) may be removed because they are not likely to be related to the BU voltage signal.

Figure 7C:
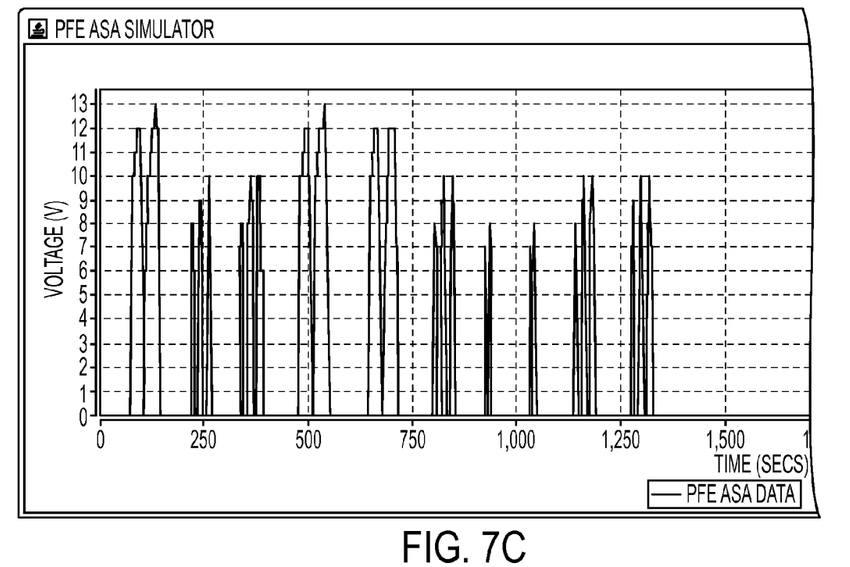

The voltage data may also be preprocessed to reduce or remove 622 noise, for example, by rescaling the data and filtering any noise past a configurable threshold. According to one example, the data may be rescaled such that higher magnitude voltage values are given a proportionately larger value and smaller values are reduced in amplitude. Other noise reduction or removal techniques known to those skilled in the art may also be used. FIG. 7C shows one example of the voltage data after noise has been reduced or removed.

Figure 7D:
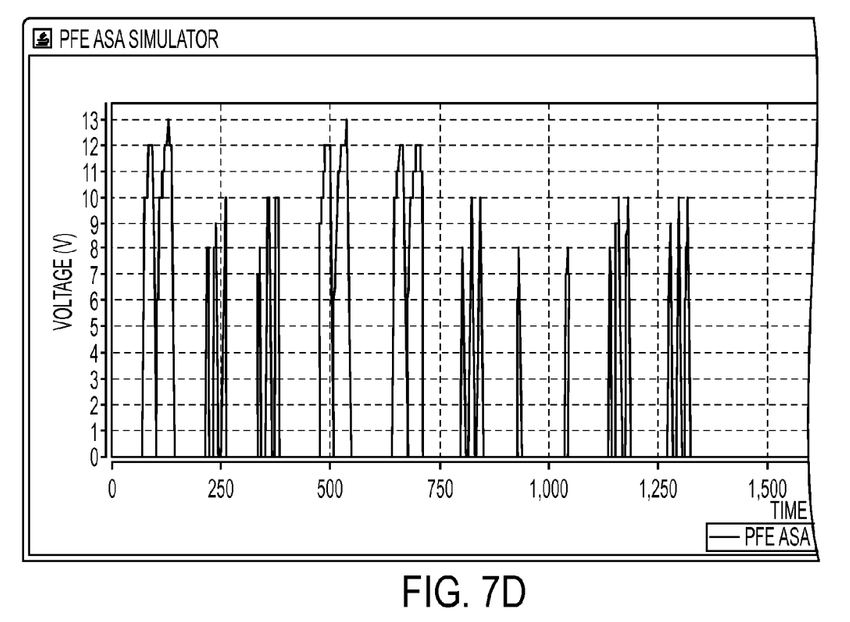
Figure 7E:
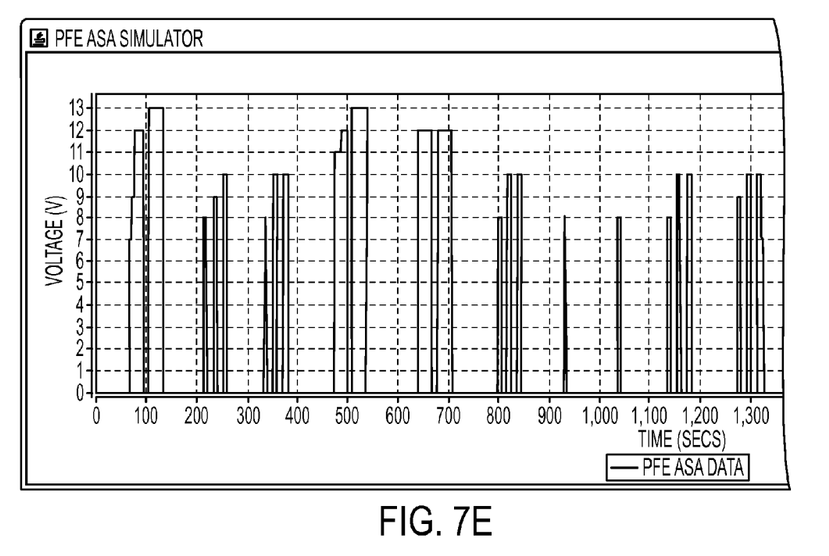
Figure 7F:
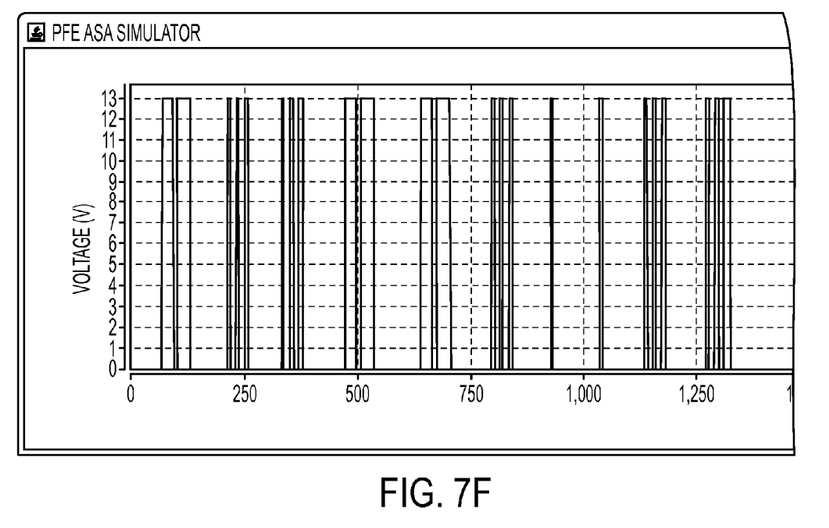
Figure 7G:
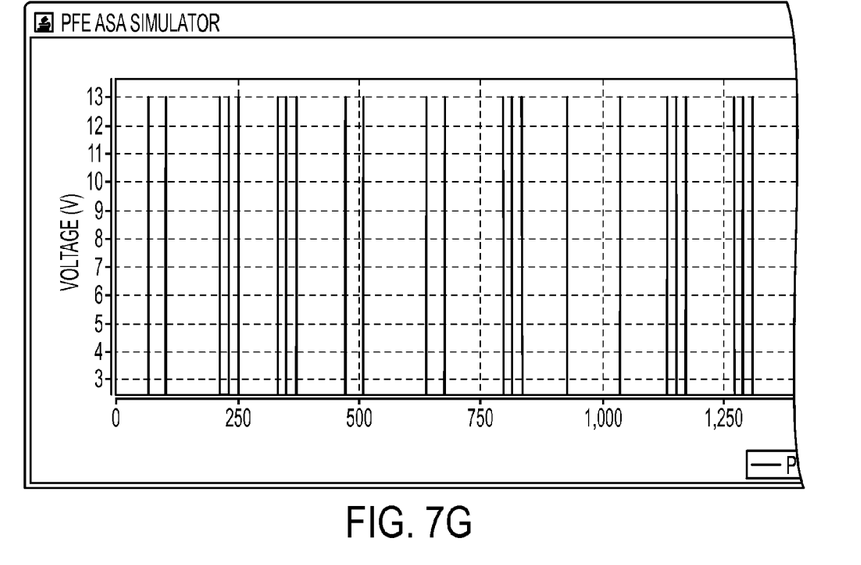

The voltage data may also be preprocessed to remove 623 any spikes in the data that are less than the expected dwell time of a pulse used in a voltage signal. The FIG. 7D shows one example of the preprocessed voltage data after spikes have been removed. The edges of the remaining peaks may then be detected 624 to remove any "jagged" edges and form square edges, which facilitates the creation of square pulses. FIG. 7E shows one example of the preprocessed voltage data after edges have been detected. After detecting and squaring the edges, square pulses may be created 625. FIG. 7F shows one example of the preprocessed voltage data after square pulses are created. After the square pulses are created, the data may be differentialized 626 using a differential algorithm to create a series of data points that map to the rising edge of the square pulses, thereby resulting in voltage signals that may be easily detected and analyzed. FIG. 7G shows one example of the preprocessed voltage data after differentialization.

After preprocessing 610-626, the data may be analyzed 630, for example, by cycling through the preprocessed pulses and determining a best match with pulses in one of a plurality of predetermined voltage signal signatures. A match may be determined, for example, by comparing a frequency and time distribution of the preprocessed data points (mapped to the detected signal pulses) to a frequency and time distribution of a predetermined number of pulses of the predefined voltage signal signatures. A detected voltage signal with three preprocessed data points (corresponding to three pulses) separated by a predetermined time, for example, may be determined to match the predetermined voltage signal signature for an affirmative "yes" response (see FIG. 2). As used herein, a best match does not necessarily require an exact match to a predetermined voltage signal signature and may be a match within a configurable tolerance such that the detected voltage signal is most likely to correspond to the predetermined voltage signal.

Figure 7H:
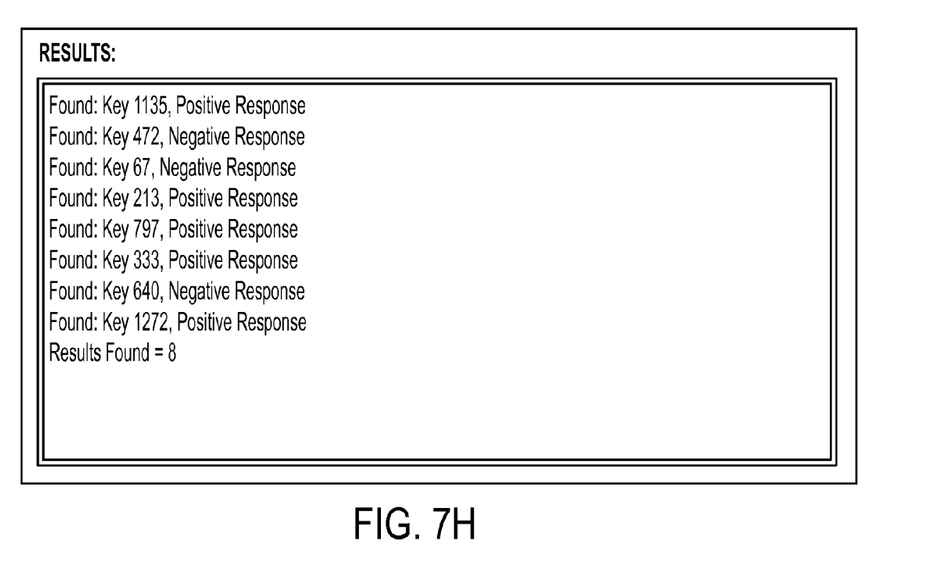

Each of the predetermined voltage signal signatures may be associated with indicators that provide information (e.g., an affirmative or negative response). After the best match(es) are determined, the results of the analysis may be recorded 632. For example, the indicators associated with the matching predetermined voltage signal signatures and the locations (i.e., the time in the data set) of the detected voltage signals may be stored and/or provided to a user (e.g., the operator of a NMS). FIG. 7H shows one example of the recorded results for detected voltage signals.

Although specific validation and preprocessing operations are described above, other validation and/or preprocessing operations may be performed instead of or in addition to those described above. For example, data correlation techniques known to those skilled in the art may also be used when preprocessing the voltage data, for example, to correlate the data set against control data representing predetermined voltage signal signatures (e.g., affirmative and negative response control data). The parameters used to perform the validation, preprocessing and analysis may also be configurable. For example, the thresholds used for normalizing, smoothing, noise reduction, and spike removal may be configurable.

Embodiments of the PASA system and method can be implemented as a computer program product for use with a computer system (e.g., as a component of the NMS software or a function called by the NMS). Such implementations include, without limitation, a series of computer instructions that embody all or part of the functionality previously described herein with respect to the system and method. The series of computer instructions may be stored in any machine-readable medium, such as semiconductor, magnetic, optical or other memory devices, and may be transmitted using any communications technology, such as optical, infrared, microwave, or other transmission technologies. It is expected that such a computer program product may be distributed as a removable machine-readable medium (e.g., a diskette, CD-ROM), preloaded with a computer system (e.g., on system ROM or fixed disk), or distributed from a server or electronic bulletin board over the network (e.g., the Internet or World Wide Web).

Those skilled in the art should appreciate that such computer instructions can be written in a number of programming languages for use with many computer architectures or operating systems. For example, preferred embodiments may be implemented in a procedural programming language (e.g., "C") or an object oriented programming language (e.g., "C++" or Java). Alternative embodiments of the invention may be implemented as pre-programmed hardware elements, firmware or as a combination of hardware, software and firmware.

Accordingly, system power voltage modulations may be used to communicate with components in an optical communications system and the resulting voltage signals may be detected by analyzing the voltage data acquired from power feed equipment (PFE) in the optical communication system.

Consistent with one embodiment, a method is provided for communicating with a component in an optical communication system. The method includes: modulating a voltage level across the component to provide at least one voltage signal representing information associated with the component; acquiring voltage data from power feed equipment (PFE) in the optical communications system; processing the voltage data to detect the at least one voltage signal in the voltage data and to analyze the at least one detected voltage signal to determine at least one best match between the at least one detected voltage signal and at least one of a plurality of predetermined voltage signal signatures, the plurality of predetermined voltage signal signatures being associated with indicators for providing the information associated with the at least one component in the optical communications system; and recording the indicator associated with the at least one best match of the predetermined voltage signal signatures, wherein the indicator is indicative of the information communicated from the component.

Consistent with another embodiment, a method is provided for performing automatic signature analysis of voltage data representing system voltage across at least a portion of an optical communication system. The system voltage includes at least one voltage signal generated by modulating the voltage across at least one component in the optical communication system. The voltage signal represents information associated with the at least one component in the optical communication system. The method includes: logging voltage data acquired from power feed equipment (PFE) in the optical communication system; and processing the voltage data to detect the at least one voltage signal in the voltage data and to analyze the at least one detected voltage signal to determine at least one best match between the at least one detected voltage signal and at least one of a plurality of predetermined voltage signal signatures, the plurality of predetermined voltage signal signatures being associated with indicators for providing the information associated with the at least one component in the optical communications system.

Consistent with a further embodiment, an optical communications system includes a plurality of stations coupled by optical transmission cable and a plurality of components located along the optical transmission cable and remote from the stations. At least one of the components is configured to modulate a voltage level across the component to provide a voltage signal representing information associated with the component. The optical communications system also includes at least one data acquisition system configured to acquire voltage data from power feed equipment (PFE) in the optical communications system. The optical communications system further includes at least one signature analysis system configured to log the voltage data acquired from the PFE, to process the voltage data to detect the at least one voltage signal in the voltage data and to analyze the at least one detected voltage signal to determine at least one best match between the at least one detected voltage signal and at least one of a plurality of predetermined voltage signal signatures. The plurality of predetermined voltage signal signatures are associated with indicators for providing the information associated with the at least one component in the optical communications system.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method for communicating with a component in an optical communication system, the method comprising:
    modulating a voltage level across the component to provide at least one voltage signal representing information associated with the component;
    acquiring voltage data from power feed equipment (PFE) in the optical communications system;
    processing the voltage data to detect the at least one voltage signal in the voltage data and to analyze the at least one detected voltage signal to determine at least one best match between the at least one detected voltage signal and at least one of a plurality of predetermined voltage signal signatures, the plurality of predetermined voltage signal signatures being associated with indicators for providing the information associated with the at least one component in the optical communications system; and
    recording the indicator associated with the at least one best match of the predetermined voltage signal signatures, wherein the indicator is indicative of the information communicated from the component,
    wherein the optical communication system includes a plurality of stations, each of the stations including an element management system (EMS) and at least one of the stations including a network management system (NMS), and wherein the voltage data is acquired by sampling PFE voltage data in at least one of said plurality of stations using the EMS in said at least one of said plurality of stations, and wherein the PFE voltage data is logged by the NMS in at least one of the stations for said processing.

2. The method of claim 1 further comprising providing a command to the component in the optical communication system, wherein the voltage level is modulated across the component to provide the voltage signal in response to an attempted execution of the command.

3. The method of claim 2 wherein the information represented by the voltage signal includes an affirmative or negative response indicative of a successful or unsuccessful execution of the command.

4. The method of claim 1 further comprising providing a query to the component in the optical communication system inquiring about a status of the component, wherein the voltage level is modulated across the component to provide the voltage signal in response to a determination of the status of the command.

5. The method of claim 1 wherein the information represented by the voltage signal includes a current status of the component.

6. The method of claim 1 wherein the at least one component includes at least one branching unit in the optical communication system, and wherein the information includes an affirmative or negative response indicative of a successful or unsuccessful execution of a switching command.

7. The method of claim 1 wherein modulating the voltage level across the component includes generating at least one pulse in the voltage level by turning on and off an internal voltage drop in the component.

8. A method for performing automatic signature analysis of voltage data representing system voltage across at least a portion of an optical communication system, the system voltage including at least one voltage signal generated by modulating the voltage across at least one component in the optical communication system, the voltage signal representing information associated with the at least one component in the optical communication system, the method comprising:
   logging voltage data acquired from power feed equipment (PFE) in the optical communication system; and
   processing the voltage data to detect the at least one voltage signal in the voltage data and to analyze the at least one detected voltage signal to determine at least one best match between the at least one detected voltage signal and at least one of a plurality of predetermined voltage signal signatures, the plurality of predetermined voltage signal signatures being associated with indicators for providing the information associated with the at least one component in the optical communications system,
   wherein the optical communication system includes a plurality of stations, each of the stations including an element management system (EMS) and at least one of the stations including a network management system (NMS), and wherein the voltage data is acquired by sampling PFE voltage data in at least one of said plurality of stations using the EMS in said at least one of said plurality of stations, and wherein the PFE voltage data is logged by the NMS in at least one of the stations for said processing.

9. The method of claim 8 wherein processing the voltage data includes processing the voltage data in said network management system (NMS).

10. The method of claim 8 wherein the information represented includes an affirmative or negative response indicative of successful or unsuccessful execution of a command.

11. The method of claim 8 wherein the at least one component includes at least one branching unit in the optical communication system, and wherein the information represented includes an affirmative or negative response indicative of successful or unsuccessful execution of a switching command.

12. The method of claim 8 wherein processing the voltage data to detect the voltage signal includes validating and preprocessing the voltage data.

13. The method of claim 8 wherein the voltage signal is generated by modulating the voltage with at least one pulse.

14. The method of claim 13 wherein processing the voltage data to detect the voltage signal includes preprocessing the voltage data to form square pulses.

15. A machine-readable medium whose contents, when executed by a computer system, cause the computer system to perform the method of claim 8.

16. A machine-readable medium whose contents, when executed by a computer system, cause the computer system to perform the method of claim 13.

17. An optical communications system comprising:
   a plurality of stations coupled by optical transmission cable;
   a plurality of components located along the optical transmission cable and remote from the stations, wherein at least one of the components is configured to modulate a voltage level across the component to provide a voltage signal representing information associated with the component;
   at least one data acquisition system configured to acquire voltage data from power feed equipment (PFE) in the optical communications system; and
   at least one automated signature analysis system configured to log the voltage data acquired from the PFE, to process the voltage data to detect the at least one voltage signal in the voltage data and to analyze the at least one detected voltage signal to determine at least one best match between the at least one detected voltage signal and at least one of a plurality of predetermined voltage signal signatures, the plurality of predetermined voltage signal signatures being associated with indicators for providing the information associated with the at least one component in the optical communications system;
   an element management system (EMS) located in a plurality of the stations, the element management system being configured to sample PFE voltage; and
   a network management system (NMS) server located in at least one of the stations, the NMS server including the data acquisition system and the automated signature analysis system.

18. The optical communications system of claim 17 wherein the components include at least one branching unit.

19. The optical communications system of claim 17 wherein the at least one branching unit is configured to modulate a voltage level across the branching unit to provide a voltage signal in response to an attempted execution of a switching command.

20. The optical communications system of claim 17 wherein at least one of the stations includes the signature analysis system.

* * * * *